(12) United States Patent
Wetter

(10) Patent No.: US 6,315,359 B1
(45) Date of Patent: *Nov. 13, 2001

(54) CHILD SAFETY SEAT

(75) Inventor: Hermann Wetter, Ulm (DE)

(73) Assignee: Britax Romer Kindersàcherheit, Ulm (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,131

(22) Filed: Nov. 2, 1999

(30) Foreign Application Priority Data

Nov. 11, 1998 (GB) .................................................. 9824728

(51) Int. Cl.⁷ ........................................................ A47C 1/08
(52) U.S. Cl. ..................................... 297/250.1; 297/423.1
(58) Field of Search .............................. 297/250.1, 256.1, 297/423.1, 423.18, 423.4

(56) References Cited

U.S. PATENT DOCUMENTS

| 1,828,470 | * | 10/1931 | Monnot | 297/423.18 |
|---|---|---|---|---|
| 1,872,444 | * | 8/1932 | Gowie | 297/423.18 |
| 2,044,992 | * | 6/1936 | May | 297/423.18 |
| 2,582,507 | * | 1/1952 | Sedlacek | 297/423.1 X |
| 4,278,289 | * | 7/1981 | Esposito | 297/423.1 X |
| 5,496,092 | * | 3/1996 | Williams et al. | 297/250.1 |
| 5,505,519 | | 4/1996 | Natt . | |

FOREIGN PATENT DOCUMENTS

| 0619201 | 10/1994 | (EP) . |
|---|---|---|
| 0751035 | 1/1997 | (EP) . |

* cited by examiner

*Primary Examiner*—Peter M. Cuomo
*Assistant Examiner*—Stephen Vu
(74) *Attorney, Agent, or Firm*—Davis & Bujold, P.L.L.C.

(57) ABSTRACT

The seat portion of a rearward facing child safety seat has static rear part and a movable front part which is movable between a deployed position in which its upper surface is contiguous with that of the rear part and a stowed position leaving an opening in front of the rear part for receiving the legs of an older child occupying the child seat with his knees bent and his feet positioned below the level of the static rear part.

12 Claims, 9 Drawing Sheets

CHILD SAFETY SEAT

FIELD

This invention relates to a child safety seat of the type adapted to be positioned in a rearward facing orientation on a vehicle seat and having a seat body and a support member adapted to abut against the seat back of the vehicle seat, the seat body comprising a seat portion and a backrest.

RELATED ART

A child safety seat of this type is described in EP-A-751035. Continued use of known seats of this type as a child grows, is limited by abutment of the child's feet against the vehicle seat back. One solution for this problem is to increase the distance between the vehicle seat back and the child seat body. However, this has the disadvantage of reducing the distance between the child's head and the structure of the vehicle in front of the vehicle seat on which the child seat is positioned. In addition, this has the result of increasing the length of belt required when the child seat is secured to the vehicle seat using the vehicle seat belt. A further disadvantage is that parents may be tempted to alleviate the problem by setting the child's seat in a more upright position. This can be uncomfortable and, in extreme cases, risk damage to the child's spine.

SUMMARY OF THE INVENTION

According to the invention, in a child safety seat of the type described above, the seat portion has a static rear part and a movable front part which is movable between a deployed position in which its upper surface is contiguous with that of the rear part and a stowed position leaving an opening in front of the rear part for receiving the legs of an older child occupying the child seat with his knees bent and his feet positioned below the level of the static rear part.

DETAILED DESCRIPTION OF THE PREFERRED EMBODIMENT

Figure 1:
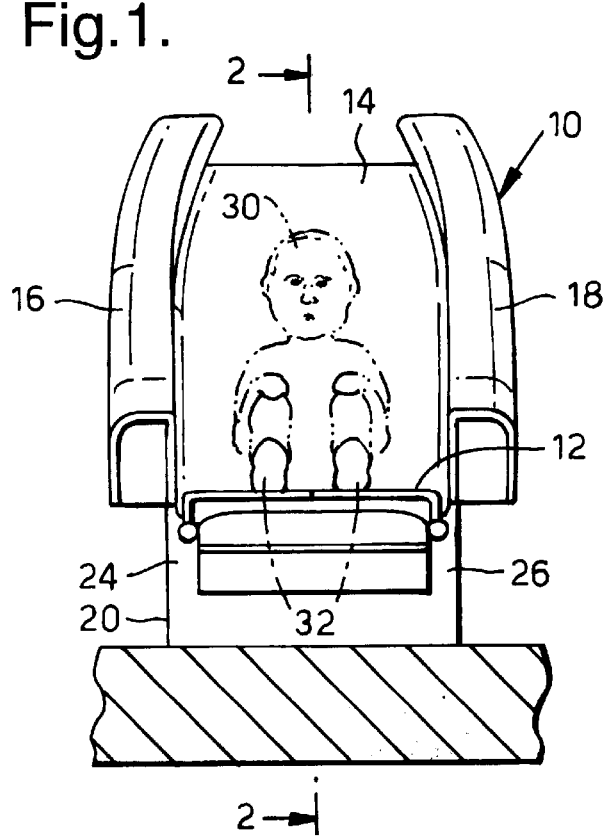
FIG. 1 is an elevational view of a child safety seat in accordance with a first embodiment of the invention, looking forwardly from the rear of the vehicle in which it is used, with the seat configured for use by a young child.
Figure 2:
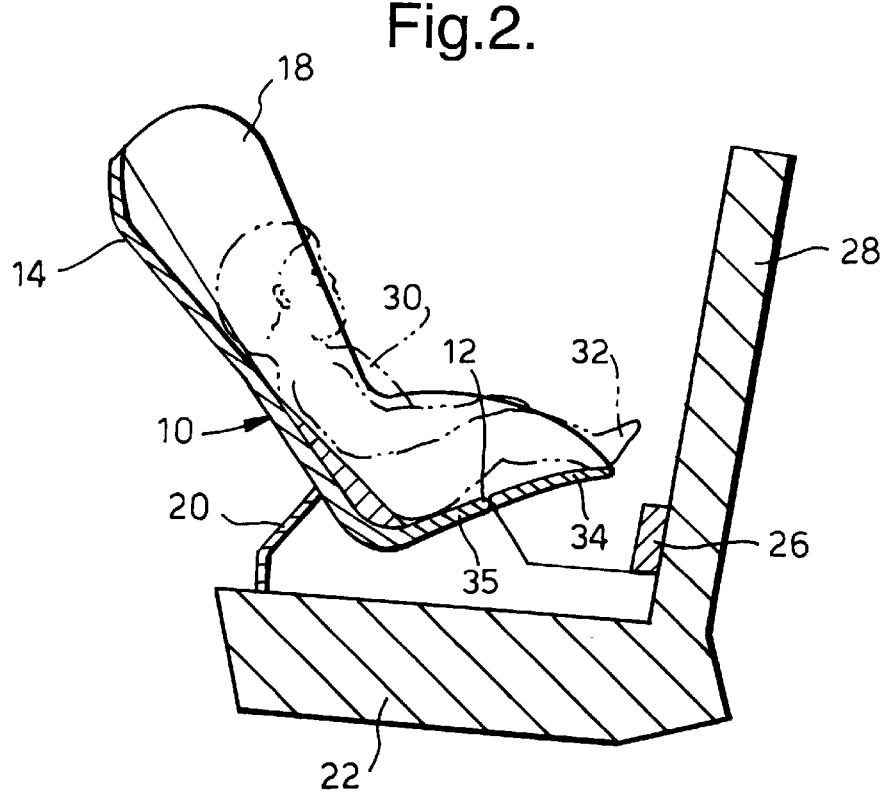
FIG. 2 is a sectional view taken on the line 2—2 in FIG. 2.

Referring to FIGS. 1 and 2, a child safety seat comprises a seat body 10 in the form of a moulded shell having seat portion 12, a backrest 14, and side walls 16 and 18. The seat body 10 is mounted on a base 20 which rests on the seat portion 22 of a vehicle seat and has two limbs 24 and 26 which abut against the vehicle seat back 28. The child seat is shown as occupied by a relatively young child 30 whose feet 32 rest on a front part 34 of the seat portion 12 of the child seat body 10.

Figure 3:
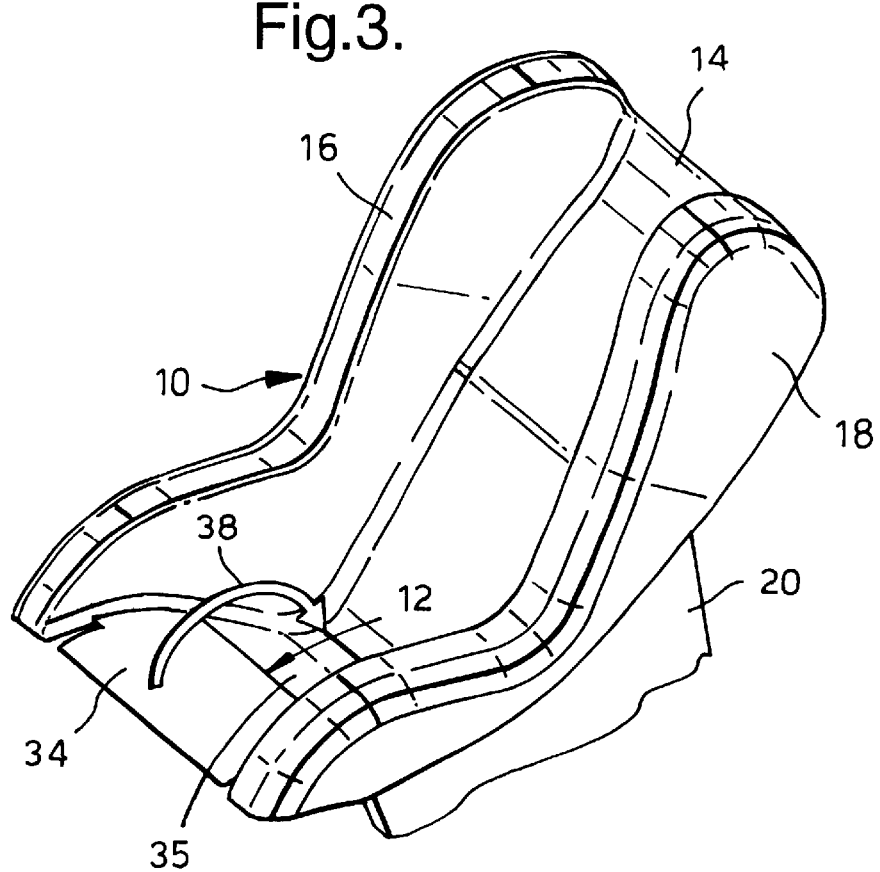
FIG. 3 is a perspective view of the seat shown in FIG. 1 with its movable panel in its deployed position.
Figure 4:
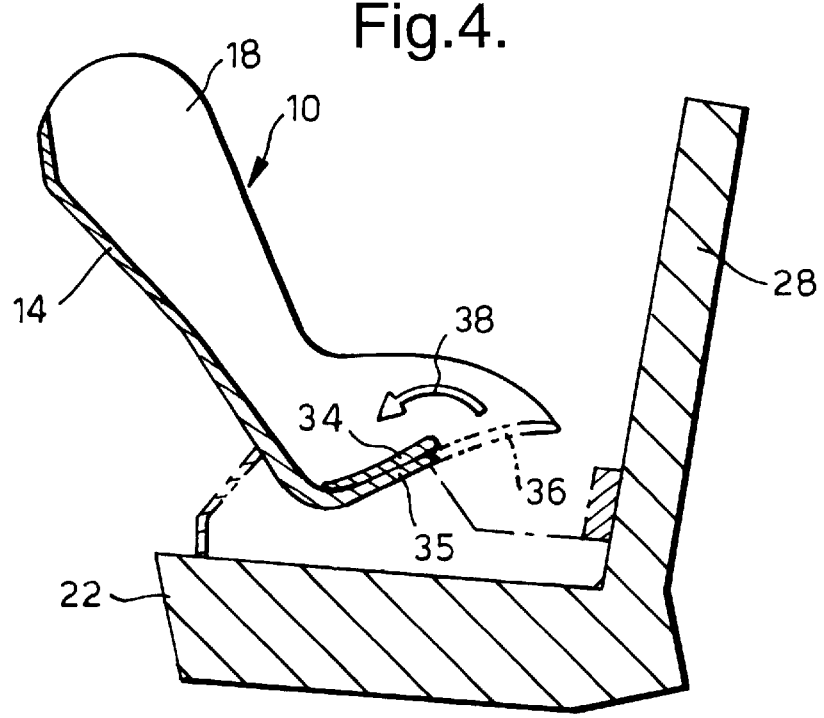
FIG. 4 is a sectional view on the line 2—2 but with the movable panel in its stowed position, for use by an older child.
Figure 5:
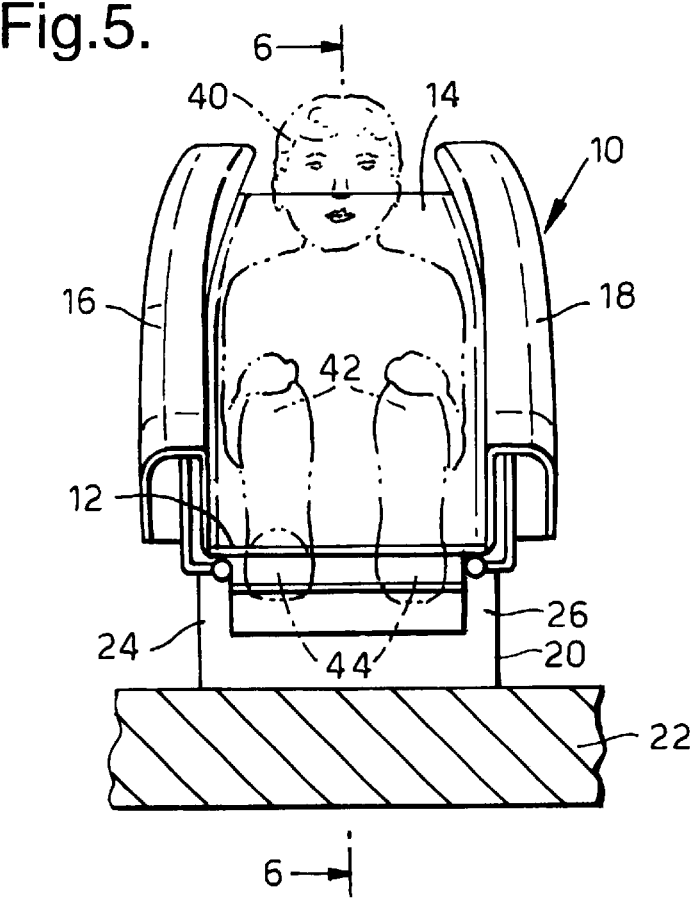
FIG. 5 is an elevational view, similar to FIG. 1, but th thy movable panel in its stowed position.
Figure 6:
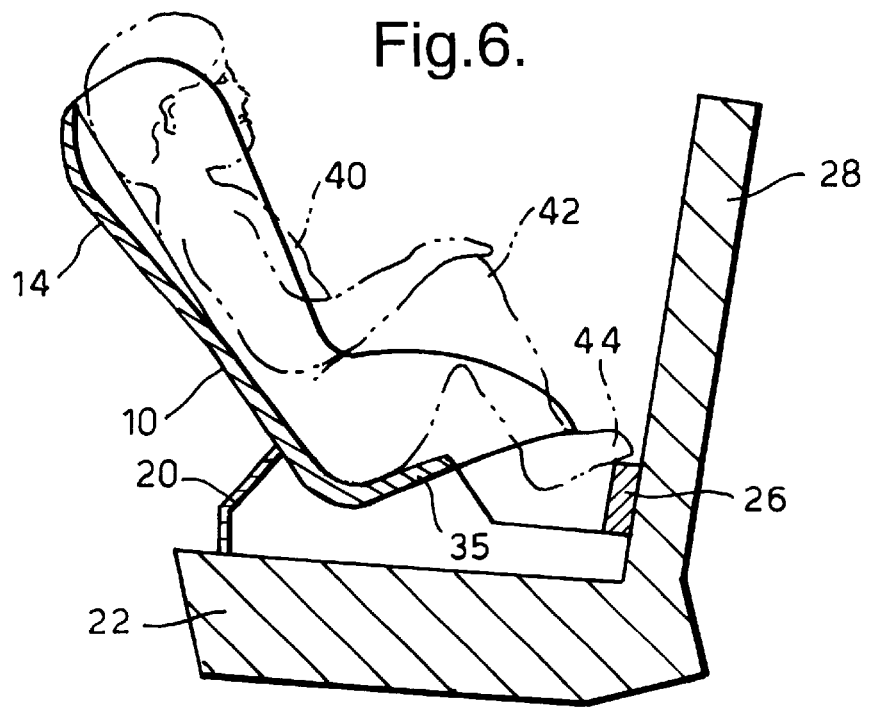
FIG. 6 is a sectional view taken on the line 6—6 in FIG. 5.

As can be seen in FIGS. 3 and 4, the front part of the seat portion 12 comprises a panel 34 which is pivotable about its rear edge between a deployed position in which it forms a forward continuation of the static rear part 35 of the seat portion 12, as shown in FIGS. 2 and 3, and a stowed position shown in FIGS. 4 to 6 in which it lies on top of the static part 35 so as to leave an opening 36 between the two side walls 16 and 18, the movement to the latter position being shown by the arrow 38. As can be seen from FIGS. 5 and 6, when the panel 34 is in its stowed position, an older child 40 can sit on the seat body 10 with his knees 42 bent and his feet 44 below the seat portion 12.

Figure 7:
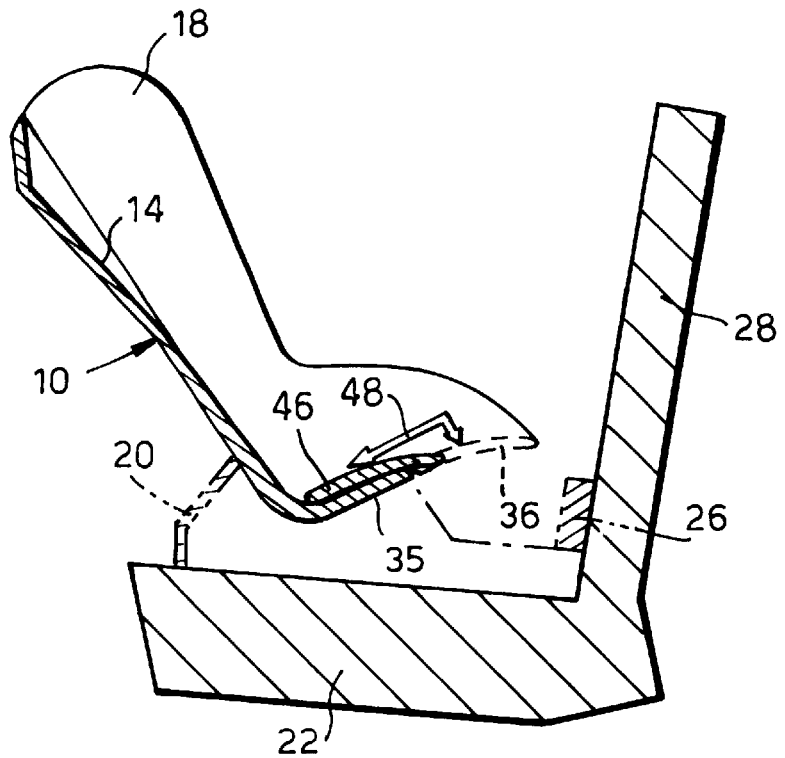
FIG. 7 is a sectional view, similar to FIG. 4, of a second embodiment of the invention.

FIG. 7 shows a second embodiment of the invention in which the pivotable panel 34 is replaced by a sliding panel 46 which is movable between a deployed position in which it covers the opening 36 and a stowed position in which it is positioned on top of the seat portion 12, as illustrated by the arrow 48. In a variant of this embodiment, the panel 46 is arranged to slide to a stowed position below the seat portion 12.

Figure 8:
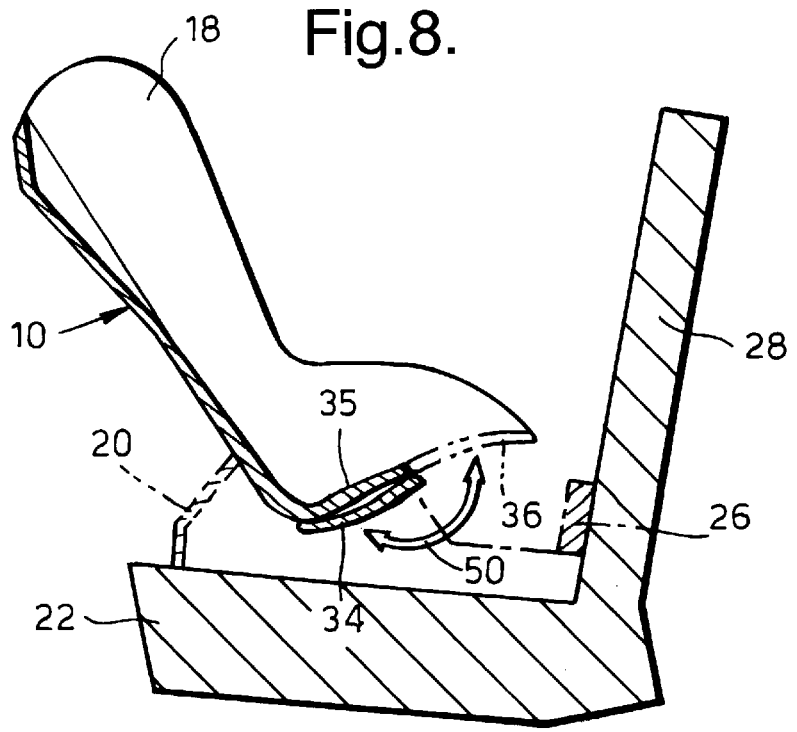
FIG. 8 is a sectional view, similar to FIG. 7, of a third embodiment of the invention.

FIG. 8 shows a third embodiment of the invention in which the pivoting panel 34 is arranged to pivot to a stowed position below the seat portion 12 instead of above it, the movement being illustrated by the arrow 50.

Figure 9:
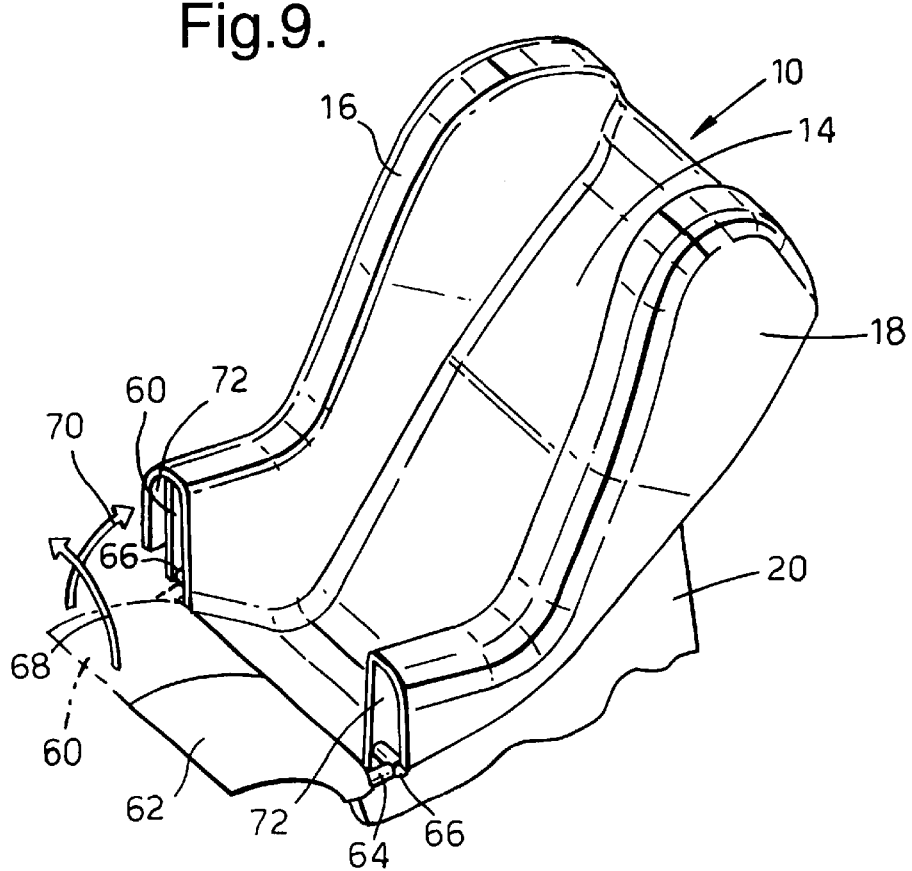
FIG. 9 is a perspective view, similar to FIG. 3, of a fourth embodiment of the invention.

FIG. 9 shows a fourth embodiment of the invention in which the side walls 16 and 18 of the seat shell only extend as far from the backrest as the edge of the static rear part 35 of the seat portion 12. In this embodiment the movable portion is in two parts 60 and 62 each of which is mounted on a respective pivot pin 64 which, in turn, projects radially from a respective stub axle 66. Each stub axle 66 projects laterally just above the level of the static seat portion 12. Each of the panels 60 and 62 can pivot from its deployed position to a vertical position on its pivot pin 64, as illustrated by the arrow 68, until it is aligned with a respective opening 72 in the corresponding side wall 16, 18.

The panels 60 and 62 can then pivot about their stub axles 66, as illustrated by the arrow 70, so as to be stowed within openings 72 in the side walls 16 and 18. The panel 60 is shown in solid lines in its stowed position and in dotted lines in its deployed position. Alternatively, the panels 60 and 62 may be stowed inside or outside the shell 14.

Figure 10:
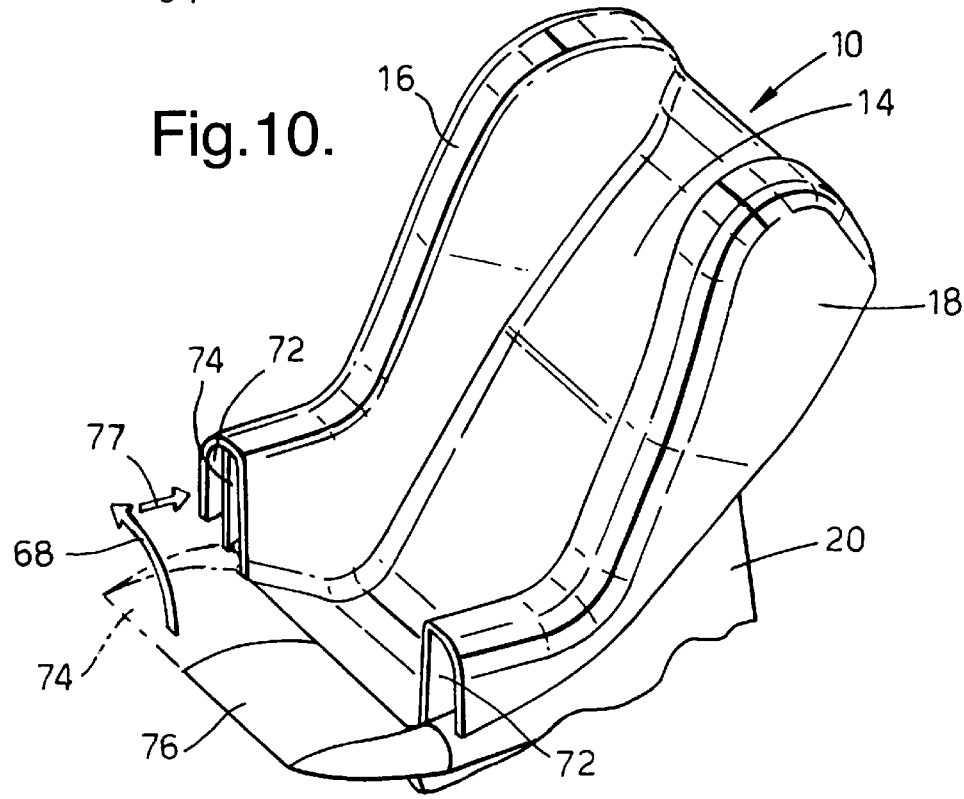
FIG. 10 is a perspective view similar to FIG. 3, of a fifth embodiment of the invention.

The embodiment of FIG. 10 differs from that of FIG. 9 in that the two front panels 74 and 76 are mounted so as to slide into the openings 72, as illustrated by the arrow 77, after pivoting to vertical positions in alignment with their respective openings 72 as illustrated by the arrow 68.

Figure 11:
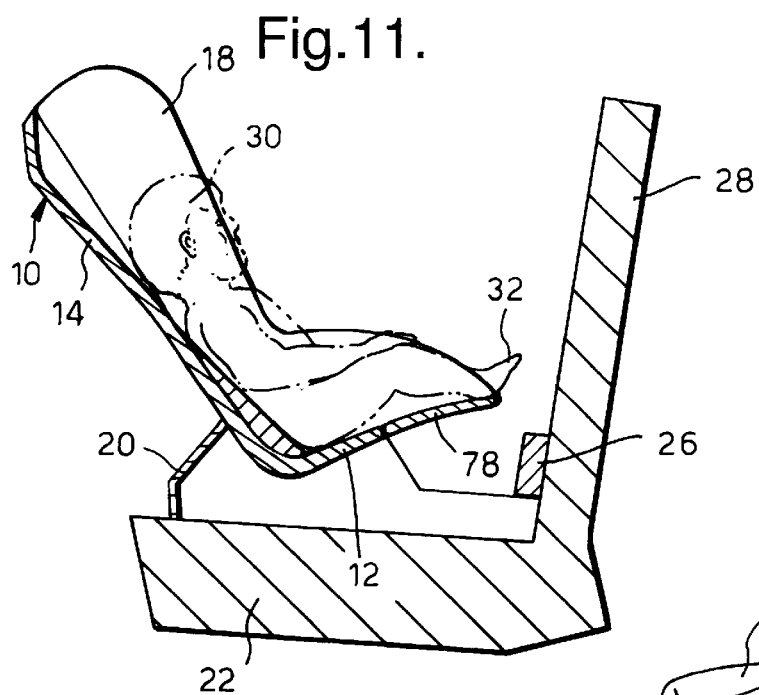
FIG. 11 is a sectional view, similar to FIG. 2, of a sixth embodiment of the invention.
Figure 12:
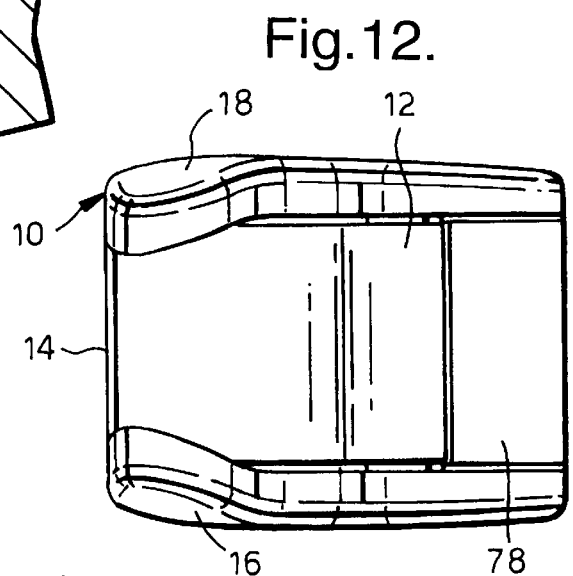
FIG. 12 is a plan view of the seat shown in FIG. 11 without a seat occupant.
Figure 13:
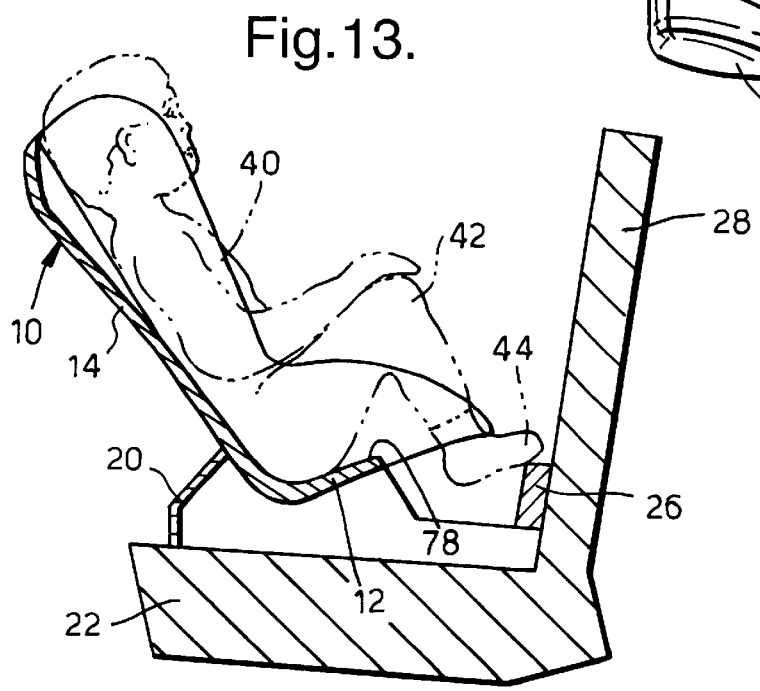
FIG. 13 is a sectional view, similar to FIG. 11, but with the movable panel in its stowed position.

FIGS. 11 to 13 show another embodiment in which the front part of the seat portion 12 comprises a movable panel 78 comprising a set of transverse slats interconnected by hinges so that the panel is flexible in the transverse direction of the seat. When the panel 78 is to be moved to its stowed position, it slides on top of the rear part of the seat portion 12 and the older child 40 sits on top of this sliding panel 78, as shown in FIG. 13. Alternatively, the panel 78 may slide underneath the rear part of the seat portion 12.

The panel 78 may be formed as a blow-moulding with bridges of reduced thickness forming integral hinges between the slats. Alternatively, the slats may be secured to a fabric layer by adhesive, the fabric forming the hinges.

Figure 14:
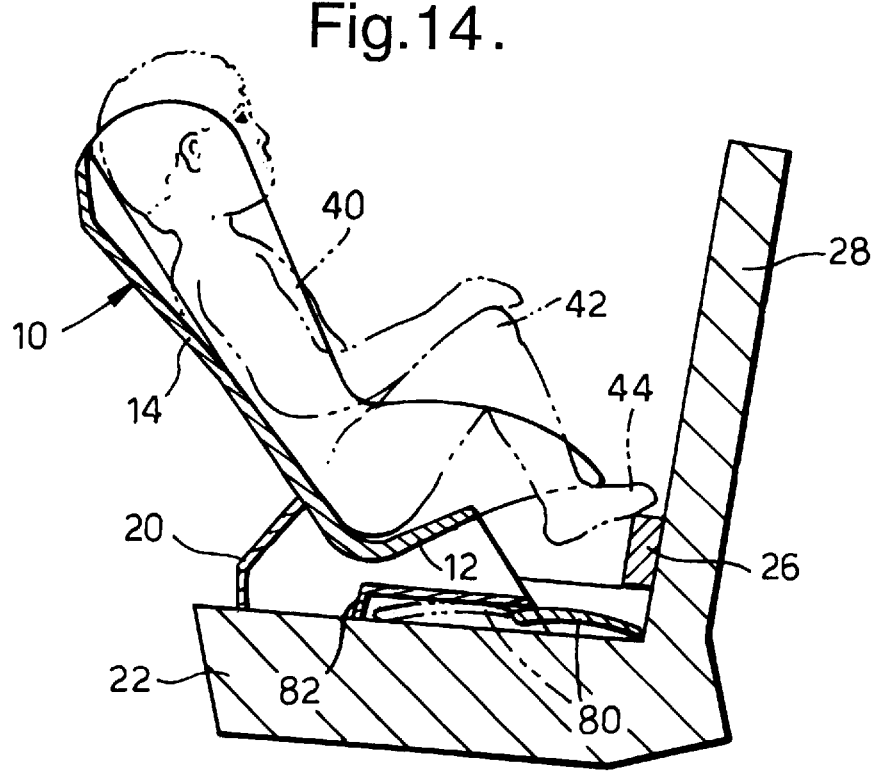
FIG. 14 is a sectional view, similar to FIG. 4, of a seventh embodiment of the invention.

FIG. 14 shows another embodiment in which the front part of the seat portion 12 comprises a rigid detachable panel 80 which can be stowed in a slot 82 in the base 20 of the child seat 10 when the seat is used by an older child 40. If desired, the panel 80 can be pulled part way out so as to project between the base 20 and the vehicle seat back 28 and thus protect the seat portion 22 of the vehicle seat from the child's feet 44.

Figure 15:
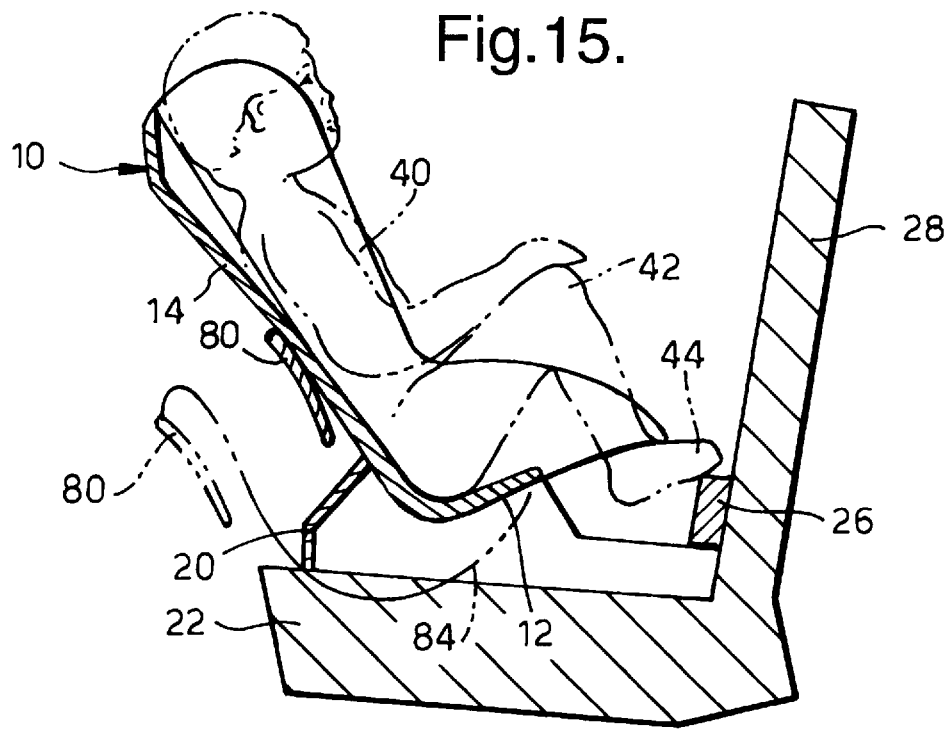
FIG. 15 is a sectional view, similar to FIG. 4 of an eighth embodiment of the invention.

FIG. 15 shows yet another embodiment having a detachable panel 80, similar to the correspondingly numbered panel in FIG. 14, which is secured to the child seat body 10 by a flexible cord 84. When the seat shown in FIG. 15 is being used by an older child, the panel 80 is clipped on to the outside of the backrest 14.

Figure 16:
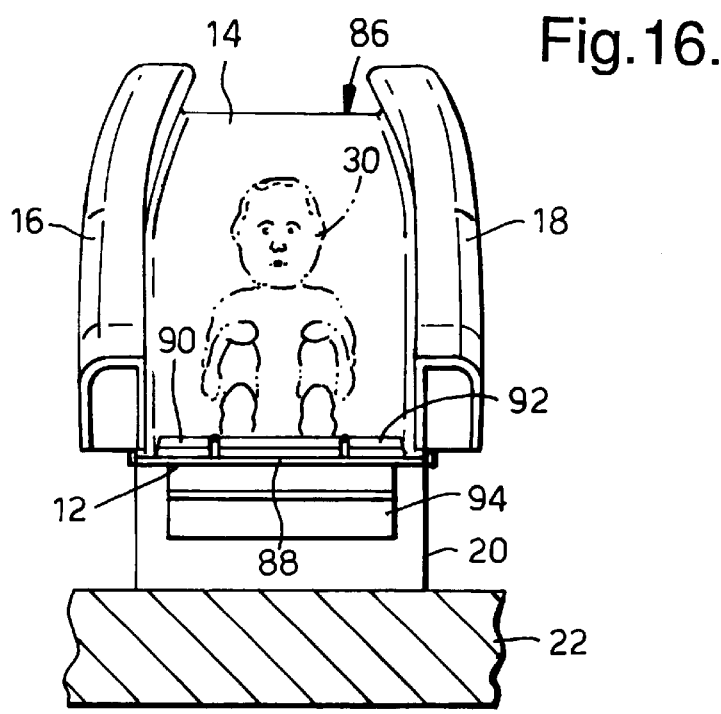
FIG. 16 is a front view of a ninth embodiment of the invention, with a folding movable panel in its deployed position.
Figure 17:
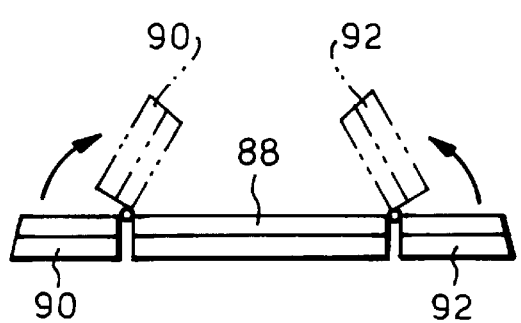
FIG. 17 is a scrap view of the movable panel of FIG. 16 illustrating its movement through its stowed position.
Figure 18:
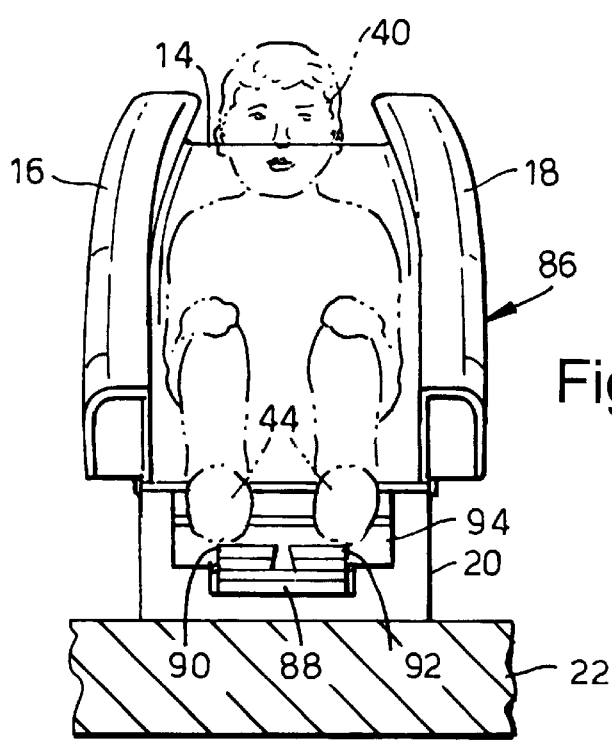
FIG. 18 is a front view, similar to FIG. 16, but with the sable panel in its stowed position.
Figure 19:
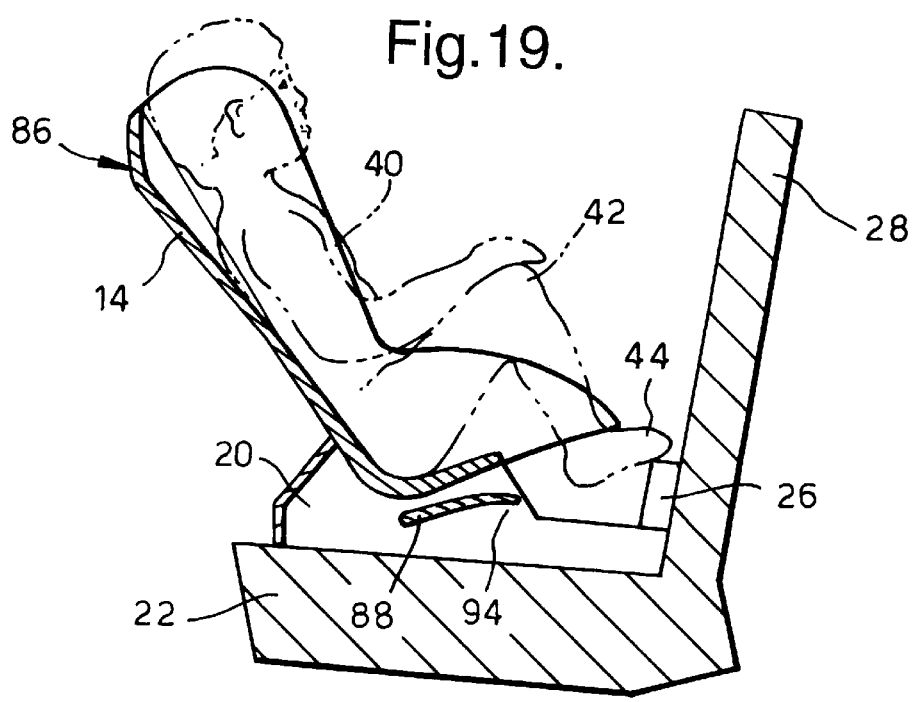
FIG. 19 is a longitudinal sectional view of the seat shown in FIG. 18.

FIG. 16 shows a child seat 86, occupied by a young child 30, which differs from the child seat 10 in that the front part of its seat portion 12 comprises a panel having a central region 88 and two side flaps 90 and 92 which can be folded inwardly as illustrated in FIG. 17. When the seat 86 is to be occupied by an older child 40 as shown in FIGS. 18 and 19, the two flaps 90 and 92 are folded inwards so as to lie on top of the central region 88 which is lowered and slid into an opening 94 in the base 20. Alternatively the flap 88 can be left partially projecting from the opening 94, so as to serve as a footrest in a similar manner to that described with reference to FIG. 14.

Figure 20:
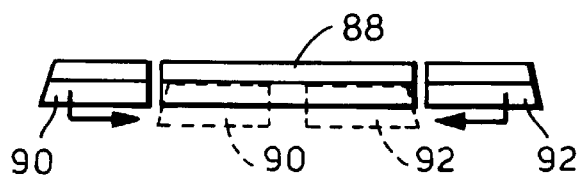
FIGS. 20 to 22 are views similar to FIG. 17, showing alternative ways of folding the movable panel.
Figure 21:
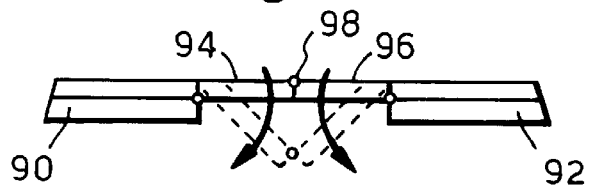
Figure 22:
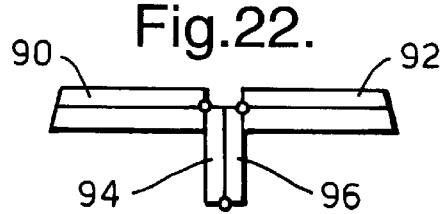

Instead of folding upwardly on to the top of the central region 88, as shown in FIG. 17, the side flaps 90 and 92 may be arranged to slide below the central region 88 as shown in FIG. 20. Alternatively, as shown in FIGS. 21 and 22, the front panel for the seat 86 may have a central region formed in two parts 94 and 96 interconnected by a central longitudinal hinge 98 which allow the parts 94 and 96 to fold downwards. The side flaps 90 and 92 are connected to the edges of the central parts 94 and 96 by hinges so as to be drawn towards one another as the central parts 94 and 96 fold downwards.

A child safety seat in accordance with any of the embodiments of the invention may be secured in place on a vehicle seat using a vehicle seat belt. Alternatively, it may be secured in place by using separate straps or by using rigid anchorages, as described in EP-A-0619201.

What is claimed is:

1. A child safety seat in combination with a motor vehicle seat having a vehicle seat and a vehicle backrest, the child safety seat comprising:
    a base resting on the vehicle seat, the base having a front side of the base positioned substantially adjacent the vehicle backrest and a rear side positioned nearer to a front edge of the vehicle seat than said front side;
    a safety seat body having a contiguous and immovably formed seat portion and backrest portion, the seat body being supported by the base and oriented on the base so that the seat portion is interposed between the vehicle backrest and the backrest portion of the safety seat body to define a rearwardly facing child safety seat;
    the seat portion further having a front edge supporting a seat extension portion moveable between a deployed position wherein the seat extension portion is substantially planarly aligned with the seat portion to substantially planarly support the lower body, knees and feet of a child secured in the seat, and a stowed position wherein the seat extension portion is moved from the deployed position to the stowed position to create a leg opening between the front edge of the seat portion and the vehicle backrest for accommodating the legs of a child occupying the child safety seat with knees bent and feet positioned below the seat portion;
    the base further comprising a support portion extending from the front side and along the vehicle seat and abutting the vehicle backrest to position the base and the safety seat body at a desired distance from the vehicle backrest such that a spacing is maintained between the front edge of the seat portion of the safety seat body and the vehicle backrest to accommodate the seat extension portion in one of the deployed position and the leg opening, when the seat extension portion is in the stowed position.

2. The child safety seat as set forth in claim 1, wherein the stowed position comprises the extension portion being moved to one of a first position supported on a top surface of the seat portion and a second position folded beneath the seat portion.

3. The child safety seat according to claim 2, wherein the seat extension portion is pivotably connected about a hinged axis on the front edge of the seat portion and rotatable about the hinged axis into one of the first position supported on a top surface of the seat portion and the second position folded beneath the seat portion.

4. The child safety seat as set forth in claim 1, wherein the front support portion of the base comprises a first and second spaced apart limbs extending from the front side of the base along the vehicle seat to abut the vehicle backrest adjacent at an intersection between the vehicle backrest and vehicle seat.

5. The child safety seat according to claim 1, wherein the seat extension portion is slidably mounted on the seat body for sliding movement between the deployed position in which seat extension portion is planarly supported adjacent but separated from the front edge of the seat portion substantially covering the leg opening and the first stowed position in which the seat extension portion overlaps the seat portion.

6. The child safety seat according to claim 5, wherein the seat extension portion comprises a set of transverse slats interconnected by hinges so as to be flexible in a transverse direction of the seat body.

7. The child safety seat according to claim 1, wherein the seat portion is provided with a first and second vertically extending hollow sidewalls and the seat extension portion comprises first and second side flaps which are moveable into a third stowed position in which the first and second side flaps are moved from the deployed position into vertical alignment with the first and second vertically extending hollow sidewalls, respectively.

8. The child safety seat according to claim 7, further comprising a pair of forwardly extending pivot axles connected to the first and second sides of the seat portion and wherein each of said first and second side flaps of the seat extension portion has an outside edge mounted on the respective first and second forwardly projecting pivot axles, wherein the first and second side flaps can rotate into vertical alignment with the first and second vertically extending hollow sidewalls, respectively.

9. The child safety seat according to claim 8, wherein each of said forwardly extending first and second pivot axles is axially mounted on a respective transverse pivot axle stub which projects laterally from said first and second sides of the seat portion.

10. The child safety seat according to claim 9, wherein the first and second side flaps are rotatable from the deployed position about the forwardly extending first and second pivot axles into vertical alignment with the first and second vertically extending hollow sidewalls, then the first and second side flaps are rotated about the laterally projecting transverse pivot axle stubs into the third stowed position.

11. The child safety seat according to claim 10, wherein in the third stowed position the first and second side flaps are installed within the first and second hollow sidewalls, respectively.

12. The child safety seat according to claim 1, wherein the seat extension portion comprises a detachable panel secured to the child seat body by a flexible cord.

* * * * *